US009508016B2

(12) United States Patent
Chi et al.

(10) Patent No.: US 9,508,016 B2
(45) Date of Patent: Nov. 29, 2016

(54) DYNAMIC LANE LINE DETECTION SYSTEM AND METHOD

(71) Applicant: Automotive Research & Test Center, Lugang, Chunghua County (TW)

(72) Inventors: Hao-Han Chi, Lugang (TW); Li-You Hsu, Lugang (TW)

(73) Assignee: AUTOMOTIVE RESEARCH & TEST CENTER, Lugang, Changhua County (TW)

( * ) Notice: Subject to any disclaimer, the term of this patent is extended or adjusted under 35 U.S.C. 154(b) by 306 days.

(21) Appl. No.: 14/317,471

(22) Filed: Jun. 27, 2014

(65) Prior Publication Data
US 2015/0278611 A1   Oct. 1, 2015

(30) Foreign Application Priority Data

Apr. 1, 2014   (TW) .............................. 103112119 A

(51) Int. Cl.
*H04N 7/18*   (2006.01)
*G06K 9/00*   (2006.01)
*B60W 30/12*   (2006.01)

(52) U.S. Cl.
CPC .......... *G06K 9/00798* (2013.01); *B60W 30/12* (2013.01); *G06K 9/00812* (2013.01)

(58) Field of Classification Search
CPC ................... G06K 9/00798; G06K 9/00812; B60W 30/12
See application file for complete search history.

(56) References Cited

U.S. PATENT DOCUMENTS

| 7,576,767 | B2 | 8/2009 | Lee et al. |
| 8,081,211 | B2 | 12/2011 | Chou et al. |
| 8,315,433 | B2 | 11/2012 | Hsu et al. |
| 8,611,598 | B2 | 12/2013 | Yankun et al. |
| 2010/0220190 | A1* | 9/2010 | Hiroshi ..................... B60R 1/00 348/148 |
| 2011/0169626 | A1* | 7/2011 | Sun ........................ B60Q 9/008 340/439 |
| 2011/0181441 | A1 | 7/2011 | Ma et al. |
| 2012/0262578 | A1 | 10/2012 | Weng et al. |
| 2013/0286205 | A1* | 10/2013 | Okada ...................... H04N 7/18 348/148 |
| 2014/0111637 | A1* | 4/2014 | Zhang ..................... B60R 1/088 348/118 |

FOREIGN PATENT DOCUMENTS

| CN | 101487895 A | 7/2009 |
| CN | 202806557 U | 3/2013 |
| TW | 201226237 A | 3/2013 |

* cited by examiner

*Primary Examiner* — Tat Chio
(74) *Attorney, Agent, or Firm* — Muncy, Geissler, Olds & Lowe P.C.

(57) ABSTRACT

A dynamic lane line detection system and method is disclosed herein. Four wide-angle lenses are respectively arranged at four sides of a vehicle and capture distorted images. A vehicular image integration unit transforms the distorted images into an ordinary planar image and presents the planar image on an image display device together with an image of lane lines as information of lane departure warning for the driver. The system undertakes moving obstacle detection, around view monitor, or parking assistant according to images captured by four wide-angle lenses and the gearshift signal, speed signal, turning angle signal received by a vehicular signal receiving device. The present invention uses the wide-angle lenses and the vehicular image integration unit to effectively integrate lane departure information with a panoramic image, whereby to decrease the economical burden of the vehicle buyer and reduce the volume of hardware.

17 Claims, 11 Drawing Sheets

DYNAMIC LANE LINE DETECTION SYSTEM AND METHOD

This application claims priority for Taiwan patent application no. 103112119 filed at Apr. 1, 2014, the content of which is incorporated by reference in its entirely.

BACKGROUND OF THE INVENTION

Field of the Invention

The present invention relates to a technology for detecting images surrounding a vehicle, particularly to a detection system and method, which transforms the distorted images, which are captured by wide-angle lenses, into undistorted images and dynamically provides lane line information in response to the vehicular signals.

Description of the Related Art

At present, vehicles are normally equipped with various vehicular safety devices, such as panoramic image detection systems, rear barrier detection systems, parking-assistant systems, and lane deviation detection systems, to protect the safety of drivers. Sometimes, lenses are arranged at the front, rear, left and right of a vehicle and cooperate with the vehicular computer to detect the images surrounding the vehicle; the programs inside the vehicular computer transforms the panoramic images into an aerial view for the driver's reference; the rear lens cooperates with the vehicular computer and the programs thereinside to detect barriers behind the vehicle and provide a parking-assistant function; the screen of the vehicular computer presents the predicted track for backing the vehicle; the front lens captures the image before the vehicle and cooperates with the programs to detect lane departure and present information of lane departure warning on the screen.

Some of the prior arts provide vehicular safety technologies integrating all vehicular safety devices in a single system. However, the lane departure warning system and the parking-assistant system need dedicated lenses, which are different from the lenses for panoramic images. The moving obstacle detection is usually integrated with the lane departure warning system and the parking-assistant system. In such a case, the moving obstacle detection cannot detect the barriers at the left and right of the vehicle but can only detect the barriers before and behind the vehicle. If the driver intends to detect the barriers at the left and right of the vehicle, he must equip the vehicle with additional lenses. Therefore, a vehicle cannot detect panoramic images, front and rear lanes, and barriers simultaneously unless the vehicle is equipped with at least 6 lenses. So far, there has not yet been a wide-angle lens able to support the abovementioned four technical characteristics. Even though all vehicular safety devices can be mounted on a vehicle, there has not yet been a system able to effectively integrate four wide-angle lenses and process information for all the vehicular safety devices. Besides, the additional lenses would increase the fabrication cost. Therefore, the vehicles available in the market can only support some of the vehicular safety devices.

In order to solve the abovementioned problems, the present invention proposes a dynamic lane line detection system and method, which uses wide-angle lenses, an image integration system and an image correction method to present lane departure warning information on an image display system, whereby various vehicular safety devices can be integrated in an identical system more effectively.

SUMMARY OF THE INVENTION

The primary objective of the present invention is to provide a dynamic lane line detection system and method, which uses a vehicular image integration unit to transform distorted images captured by wide-angle lenses into ordinary planar images, and which uses a vehicular signal receiving device to receive vehicular signals, whereby the present invention can automatically detect lane lines and actively warn the driver of lane departure without using lane detection-dedicated lenses, whereby the present invention can decrease the economical burden of the vehicle buyer and reduce the volume of hardware.

Another objective of the present invention is to provide a dynamic lane line detection system and method, which can automatically switch the safety devices of the vehicle according to the vehicular signals, including the gearshift signal and the speed signal, to dynamically provide the most effective automatic safety detection mode and detect the traffic environment surrounding the vehicle, whereby the driver can grasp the vehicular status and driving environment without splitting his mind to manually adjust the driving safety devices.

To achieve the abovementioned objectives, the present invention discloses a dynamic lane line detection system, wherein a vehicular image integration unit is electrically connected with four wide-angle lenses, which are respectively at the front, rear, left and right of a vehicle, and wherein the vehicular image integration unit is also electrically connected with a vehicular signal receiving device and an image display device. The vehicular image integration unit integrates the distorted images captured by the wide-angle lenses and the vehicular signals received by the vehicular signal receiving device, such as the gearshift signal, the speed signal, and the turning angle signal of the steering wheel. The vehicular image integration unit uses an image correction method to transform the distorted images captured by the front wide-angle lens into an ordinary planar image and presents the information of lane departure warning on the image display device. The rear wide-angle lens is to implement the track prediction of parallel parking and the track prediction of backing into a garage. The front, rear, left and right wide-angle lenses are to implement around view monitor and moving obstacle detection.

The present invention also discloses a dynamic lane line detection method, which comprises steps: obtaining distorted images with wide-angle lenses respectively arranged at four sides of a vehicle; using an image correction method to correct the distorted images and generate a planar image; detecting lane departure warning while a vehicular signal receiving device receives a non-reverse shift signal and a speed signal over a default speed; transmitting the planar image to an image display device, showing lane lines on the planar image, and providing alert sounds of lane departure warning; and selectively undertaking moving obstacle detection, around view monitor, track prediction for parallel parking or track prediction for backing into a garage while the vehicular signal receiving device receives a reverse shift signal or a speed signal below the default speed.

Below, the embodiments are described in detail in cooperation with the attached drawings to make easily understood the objectives, technical contents, characteristics and accomplishments of the present invention.

DETAILED DESCRIPTION OF THE INVENTION

The present invention proposes a dynamic lane line detection system and method, whose technical means includes using a vehicular image integration unit to integrate wide-angle lenses, a vehicular signal receiving device, and an image correction method to transform distorted images captured by the wide-angle lenses into ordinary planar images; presenting the images of the front lane lines on an image display device; if the signal received by the vehicular signal receiving device does not direct the system to detect lane departure warning (LDW), the system automatically switches to undertake moving obstacle detection (MOD), around view monitor (AVM), parking assistant system (PAS).

Figure 1:
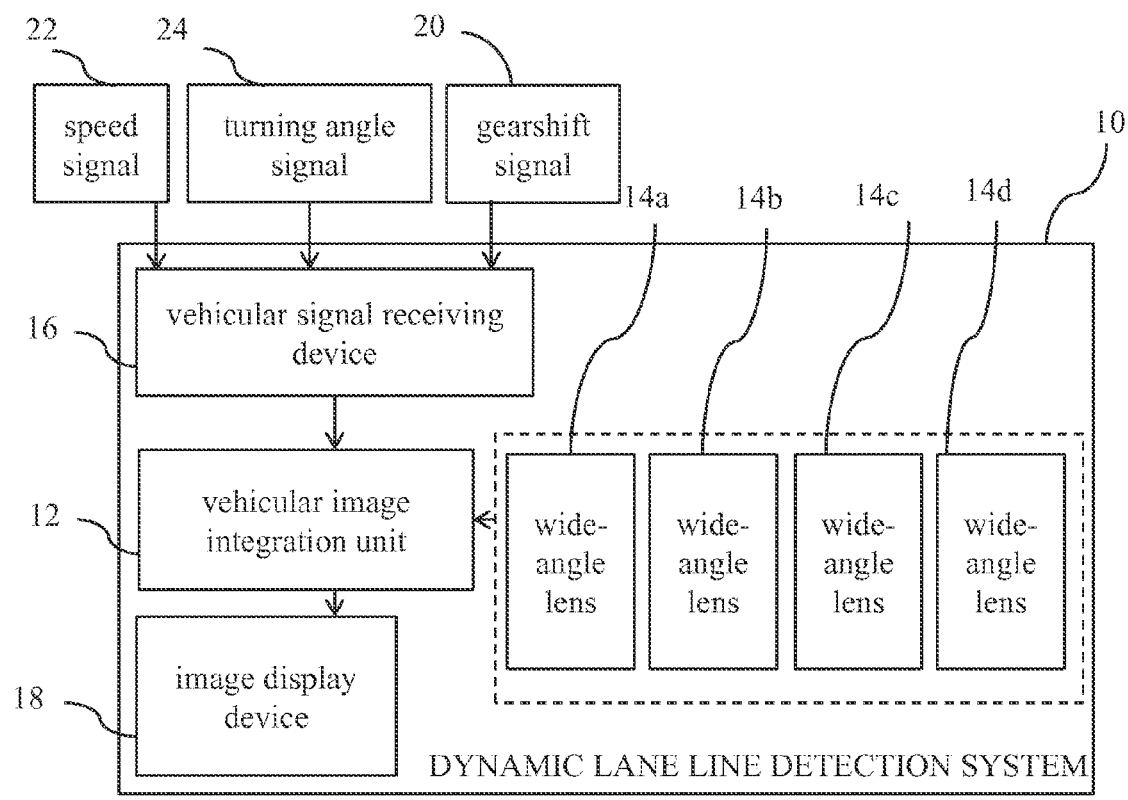
FIG. 1 is a block diagram schematically showing a dynamic lane line detection system according to one embodiment of the present invention.
Figure 2:
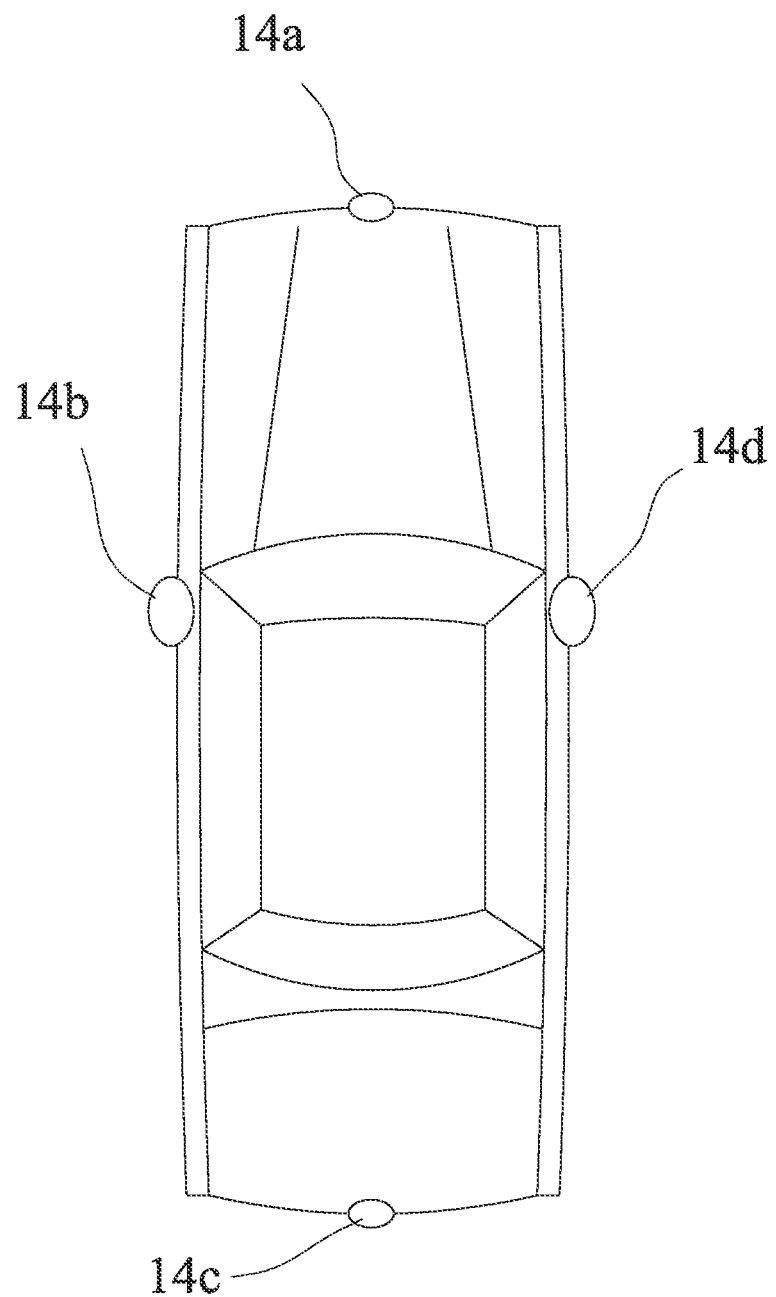
FIG. 2 is a diagram schematically showing a dynamic lane line detection system 10 according to one embodiment of the present invention.

Refer to FIG. 1 and FIG. 2 for a dynamic lane line detection system 10 according to one embodiment of the present invention. The dynamic lane line detection system 10 comprises a vehicular image integration unit 12. The vehicular image integration unit 12 includes a processor, such as Digital Signal Processor (DSP), Field-Programmable Gate Array (FPGA), Car PC, or System on Chip (SoC), to process digital signals. The vehicular image integration unit 10 is electrically connected with a plurality of wide-angle lenses. The wide-angle lenses include a front wide-angle lens 14a, a left wide-angle lens 14b, a rear wide-angle lens 14c and a right wide-angle lens 14d, which are respectively arranged at the front, left, rear and right of a vehicle, and the wide-angle lenses 14a-14d are 190 degree wide-angle lenses. The vehicular image integration unit 10 is also electrically connected with a vehicular signal receiving device 16 and an image display device 18. In one embodiment, the image display device 18 is an Light Emitting Diode(LED) display device or an liquid crystal display (LCD) device. In one embodiment, the image display device 18 can emit sounds via a speaker or a buzzer. The vehicular signal receiving device 16 receives a gearshift signal 20, a speed signal 22 and a turning angle signal 24 (of a steering wheel) transmitted by the vehicle.

Figure 3:
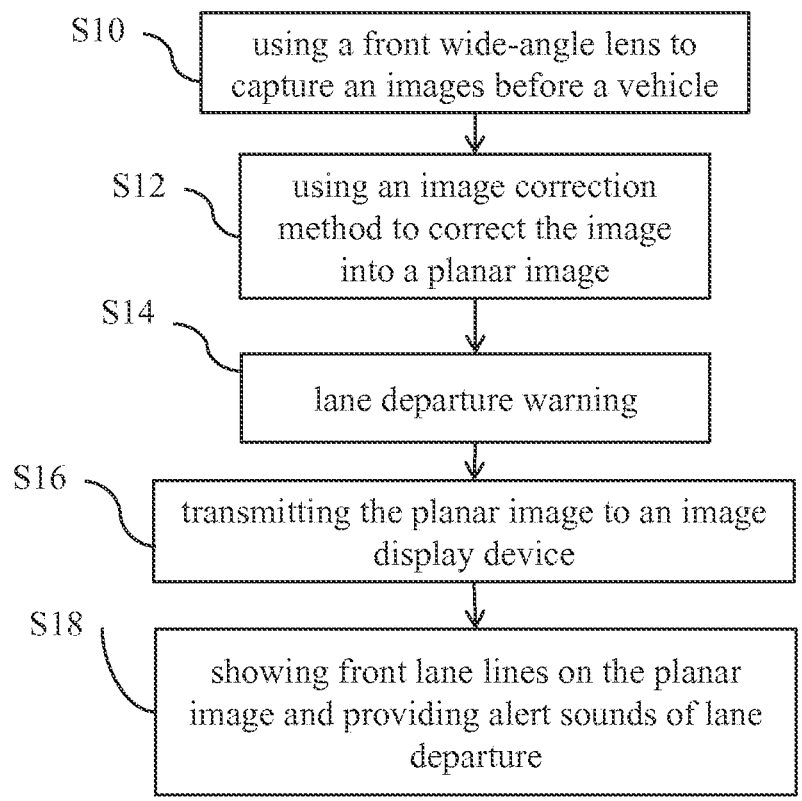
FIG. 3 shows a flowchart of a lane departure warning process of a dynamic lane line detection method according to one embodiment of the present invention.
Figure 4:
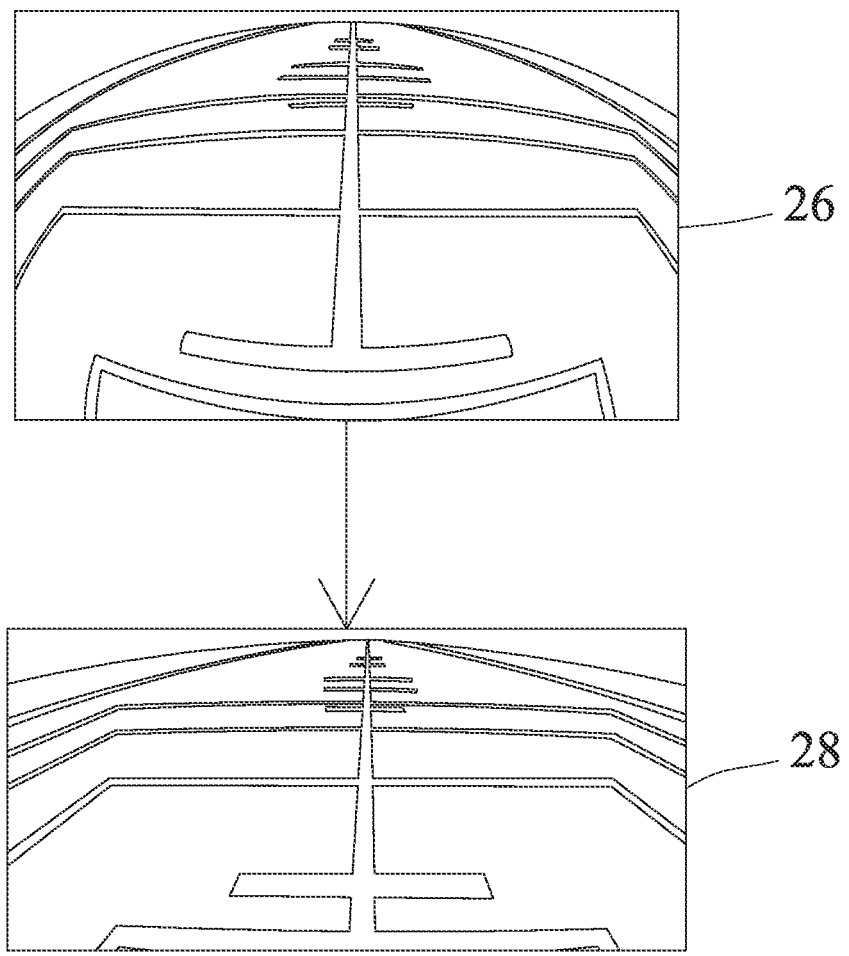
FIG. 4 shows transformation of a distorted image according to one embodiment of the present invention.

Succeeding to the description of the dynamic lane line detection system, a dynamic lane line detection method will be described below. In one embodiment, the vehicular image integration unit 12 presets the default speed to be 60 Km/h. However, the present invention does not limit that the default speed must be 60 Km/h. In the present invention, the default speed can be modified according to the driving habit of the driver. Refer to FIG. 1, FIG. 3 and FIG. 4. In Step S10, the front wide-angle lens 14a, which is arranged at the front of the vehicle, captures a distorted image 26 of the environment before the vehicle. In Step S12, the distorted image 26 is transmitted to the vehicular image integration unit 12, and the vehicular image integration unit 12 uses an image correction method to transform the distorted image 26 into an ordinary planar image 28 without undertaking the conversion of viewing angles. The vehicular signal receiving device 16 receives the gearshift signal 20, the speed signal 22 and the turning angle signal 24 (of the steering wheel), and transmits these signals to the vehicular image integration unit 12. While the vehicular image integration unit 12 receives a non-reverse shift signal and a speed signal over the default speed (60 Km/h in this embodiment), the process proceeds to Step S14. In Step S14, the system undertakes lane departure warning. In Step S16, the vehicular image integration unit 12 transmits the planar image 28 to the image display device 18. In Step S18, the vehicular image integration unit 12 presents the planar image 28 and the lane lines on the image display device 18 simultaneously, and controls the image display device 18 to warn the driver of lane departure warning with alert sounds in realtime.

Figure 5:
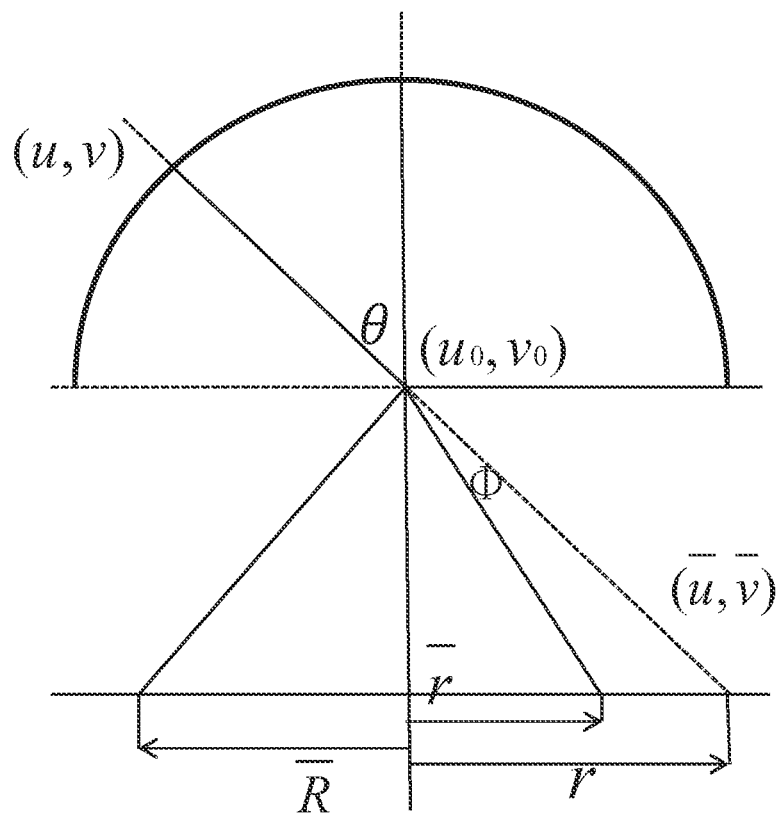
FIG. 5 schematically shows the principle of an image correction method according to one embodiment of the present invention.

Refer to FIG. 5 for the image correction method used in Step S12. The image correction method obtains the coordinates (u, v) of two points at the chord of an arc. Next, the method cross-projects the two points along two non-parallel lines to a plane and generates the coordinates of two new points $(\bar{u}, \bar{v})$. The distance between the two new points $(\bar{u},\bar{v})$ can be calculated from the ratio of the incident angle $\theta$ and the refractive angle $\Phi$ and the length of the arc according to Equations (1)-(3):

$$\bar{u} = \frac{1}{\omega r} 2\bar{R} \arctan\left(\frac{r \tan\left(\frac{\omega}{2}\right)}{\bar{R}}\right)(u - u_0) + u_0 \quad (1)$$

$$\bar{v} = \frac{1}{\omega r} 2\gamma\bar{R} \arctan\left(\frac{r \tan\left(\frac{\omega}{2}\right)}{\gamma\bar{R}}\right)(v - v_0) + v_0 \quad (2)$$

$$r = \sqrt{(u - u_0)^2 + \left(\frac{v - v_0}{\gamma}\right)^2} \quad (3)$$

wherein (u, v) are the coordinates on the distorted image, $(u_0, v_0)$ the coordinates of the center on the distorted image, $(\bar{u},\bar{v})$ the coordinates of the new points on the corrected image, and wherein $\omega$ is the curvature radius, $\bar{R}$ the radius of the distorted image, r is the distance between the two new points.

Figure 6:
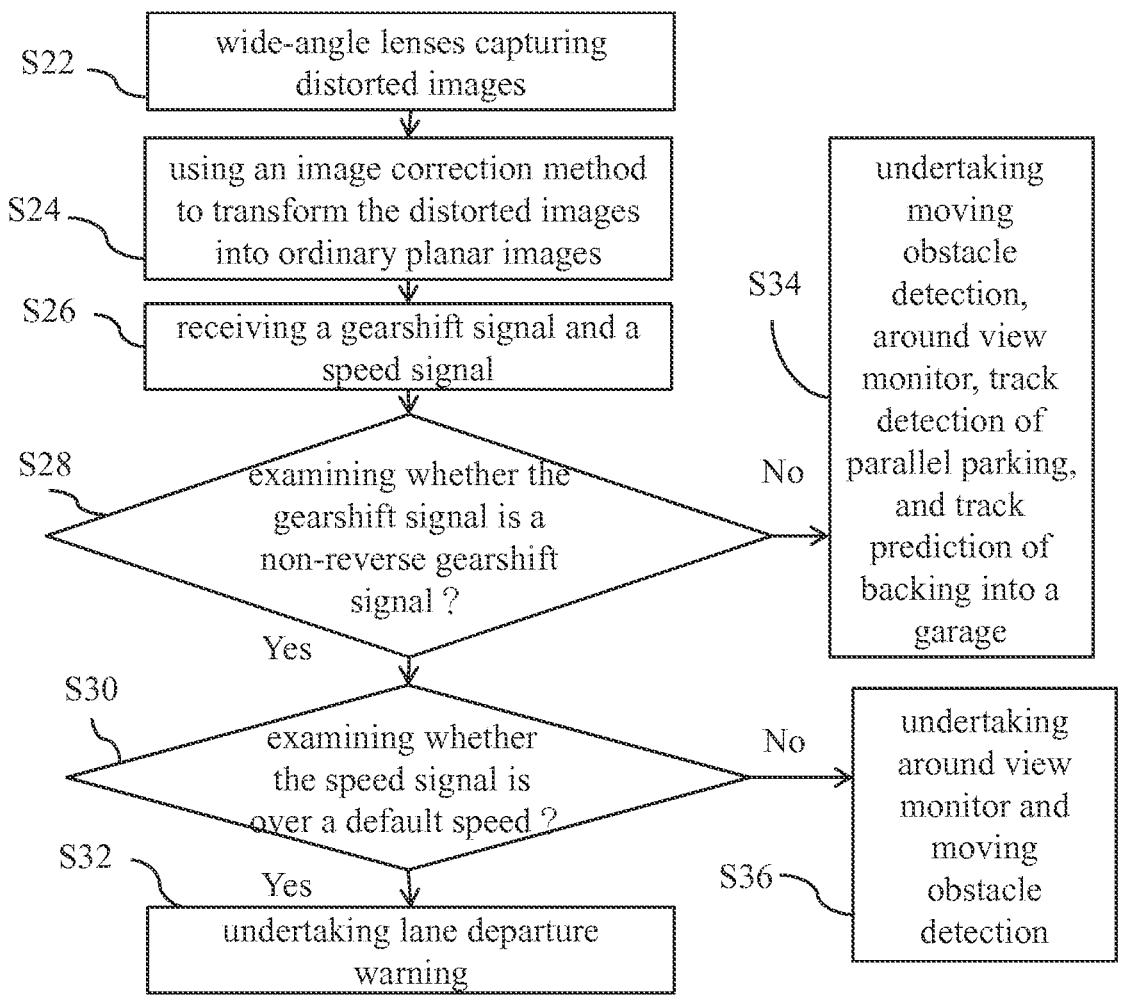
FIG. 6 shows a flowchart simultaneously involving parking assistant system and moving obstacle detection of a dynamic lane line detection method according to one embodiment of the present invention.

Refer to FIG. 1 and FIG. 6. FIG. 6 shows a flowchart simultaneously involving PAS and MOD of a dynamic lane line detection method according to one embodiment of the present invention. In Step S22, the wide-angle lenses 14a-14d at the peripheral of the vehicle capture a plurality of distorted images 26 and transmits these distorted images 26 to the vehicular image integration unit 12. In Step S24, the vehicular image integration unit 12 uses Equations (1)-(3) to transform these distorted images 26 into ordinary planar images 28. In Step S26, the vehicular signal receiving device 16 receives the gearshift signal 20 and the speed signal 22 and transmits these signals to the vehicular image integration unit 12. In Step S28, the vehicular image integration unit 12 examines whether the gearshift signal 20 is a non-reverse shift signal; if yes, it means that the gearshift signal 20 is a signal of a forward shift, such as the signal of the first shift, the second shift, the third shift or the D shift, and the process proceeds to Step S30; if not, it means that the gearshift signal 20 is a reverse shift signal, and the process proceeds to Step S34. In Step S30, the vehicular image integration unit 12 examines whether the speed signal 22 is over the default speed (60 Km/h in this embodiment); if yes, it means that the vehicle is running at a speed over the default speed 60 Km/h, and the process proceeds to Step S32; if not, it means that the vehicle is running at a speed below the default speed 60 Km/h, and the process proceeds to Step S36. In Step S32, the system undertakes lane departure warning. In Step S34, the system undertakes moving obstacle detection, around view monitor, track detection of parallel parking, and track prediction of backing into a garage. In Step S36, the system undertakes around view monitor and moving obstacle detection.

Figure 7:
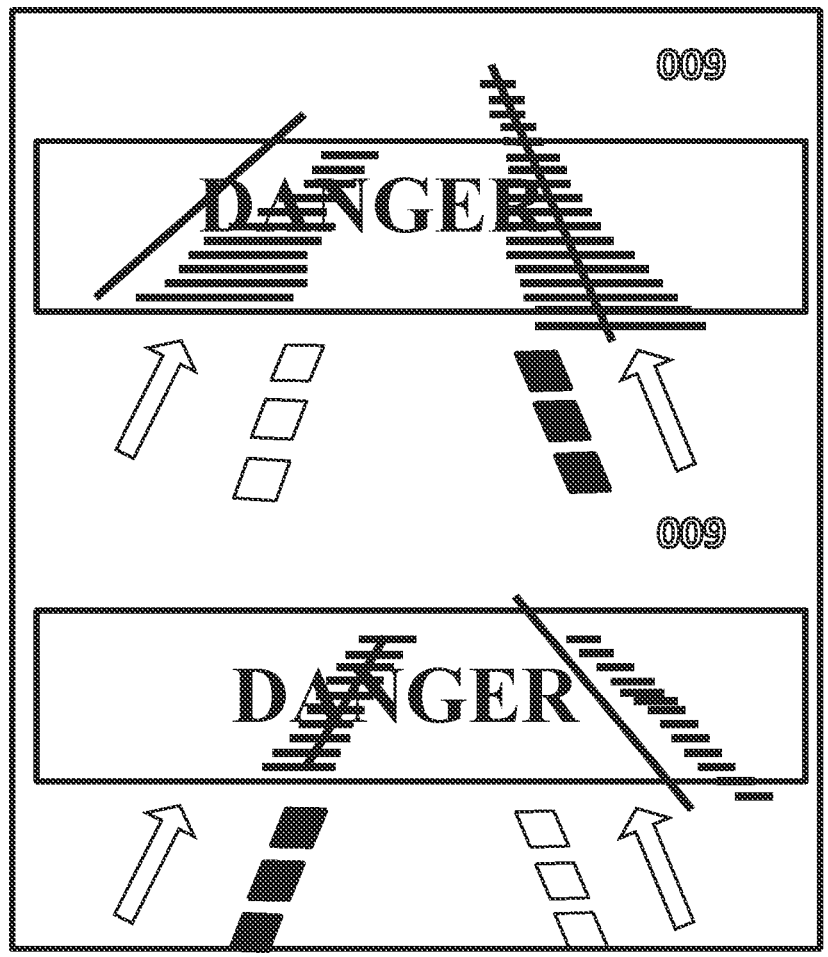
FIG. 7 shows diagrams of lane departure warning according to one embodiment of the present invention.
Figure 8A:
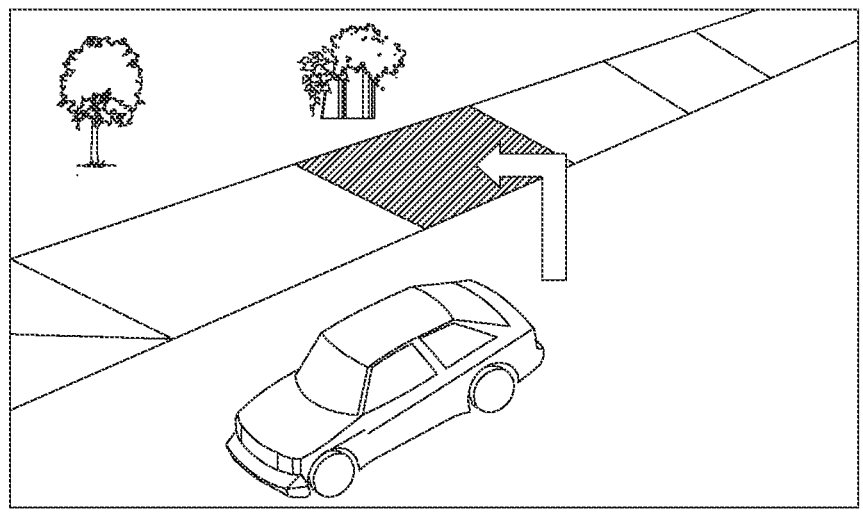
FIGS. 8a-8d respectively show diagrams of parallel parking, track prediction for parallel backing, backing into a garage, and track prediction of backing into a garage according to one embodiment of the present invention.
Figure 8B:
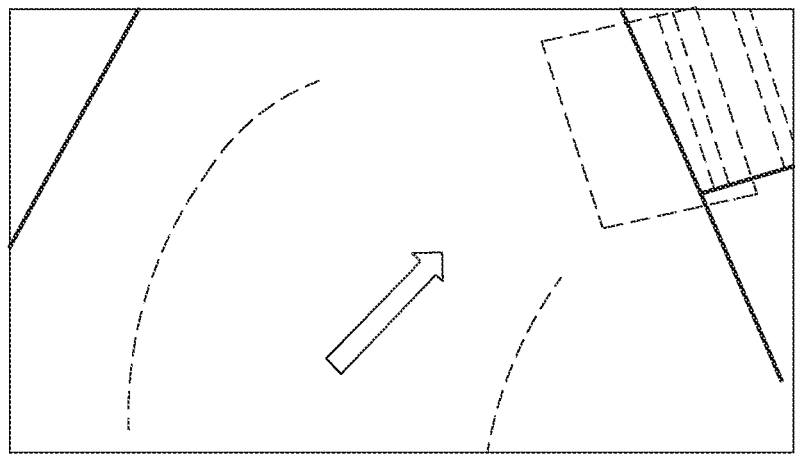
Figure 8C:
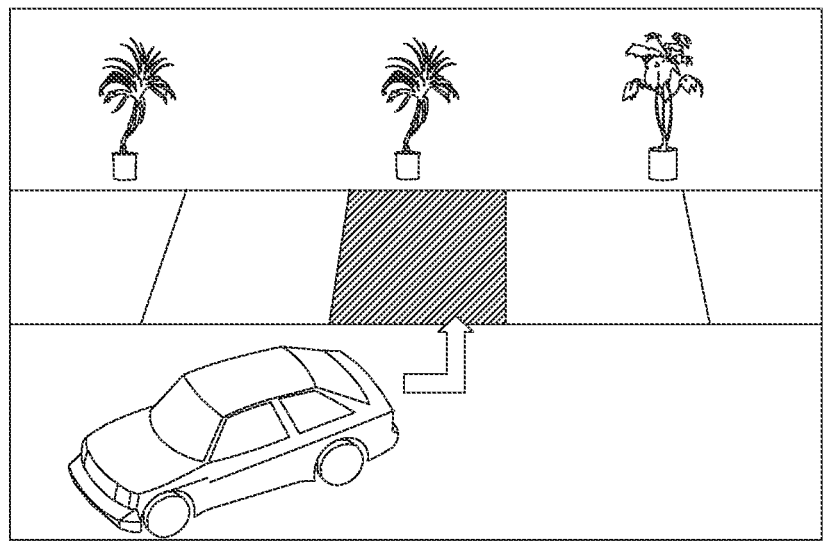
Figure 8D:
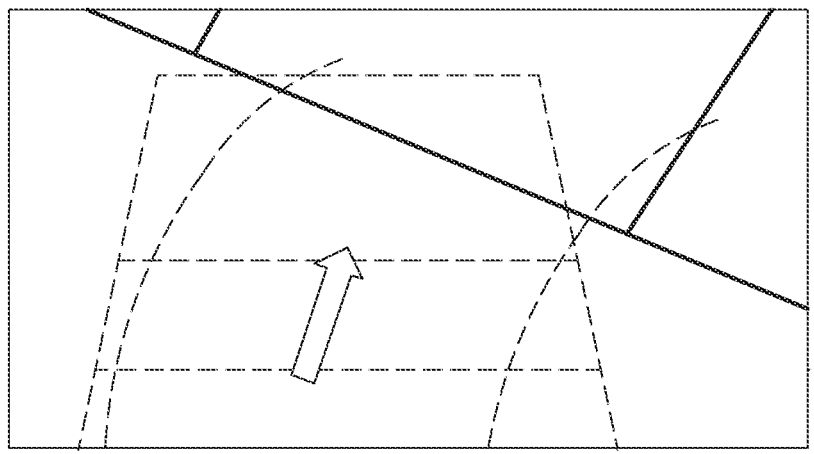

The specification further provides diagrams taken in the abovementioned steps for reference. Refer to FIG. 1 and FIG. 7. FIG. 7 shows diagrams of LDW according to one embodiment of the present invention. These images are presented on the image display device 18. While the vehicle is going to exceed the lane line, the image display device 18 presents the word "Danger" to warn the driver. Refer to FIGS. 8a-8d respectively showing diagrams of parallel parking, track prediction for parallel backing, backing into a garage, and track prediction of backing into a garage according to one embodiment of the present invention. Refer to FIG. 8a. While the vehicular signal receiving device 16 detects a reverse shift signal 20 and a turning angle signal 24 of a steering wheel, it indicates that the driver is preparing for parallel parking. Refer to FIG. 8b. The diagram display device 18 presents the diagram of the region behind the vehicle and shows a virtual frame of the parking bay where the driver intends to park his vehicle. Refer to FIG. 8c showing a diagram of a vehicle preparing for backing into a garage. Refer to FIG. 8d. According to the turning angle signal, the diagram display device 18 shows the predicted track to enable the driver to park his vehicle safely.

Figure 9A:
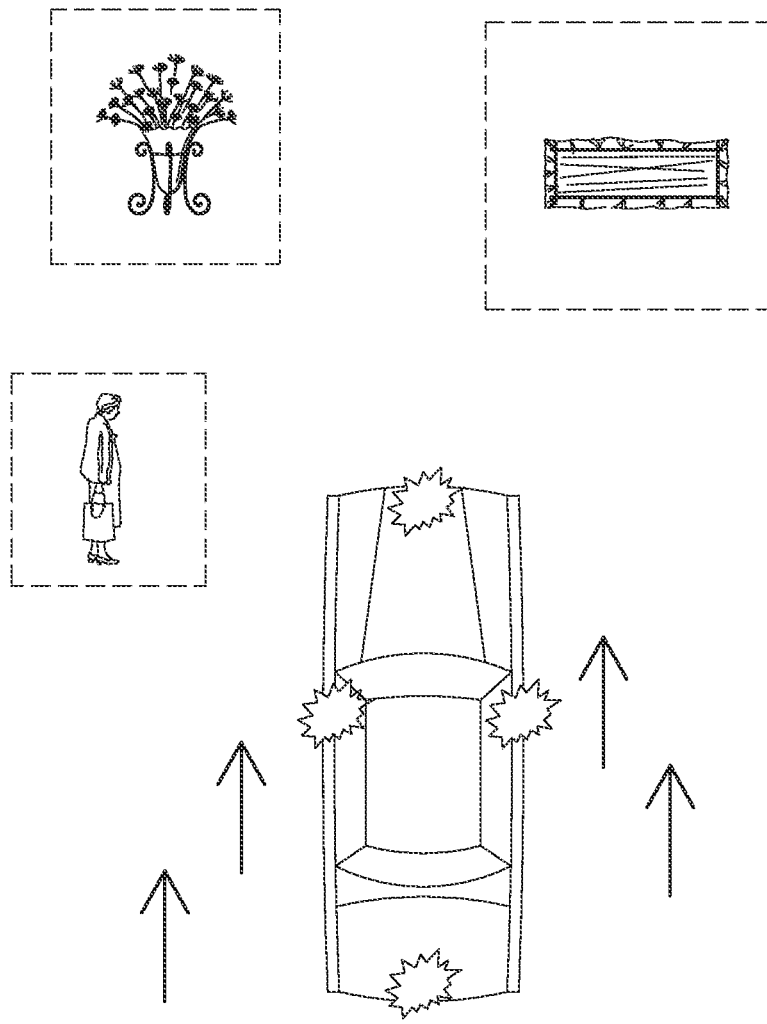
FIG. 9a and FIG. 9b respectively show a panoramic image and a diagram of moving obstacle detection according to one embodiment of the present invention.
Figure 9B:
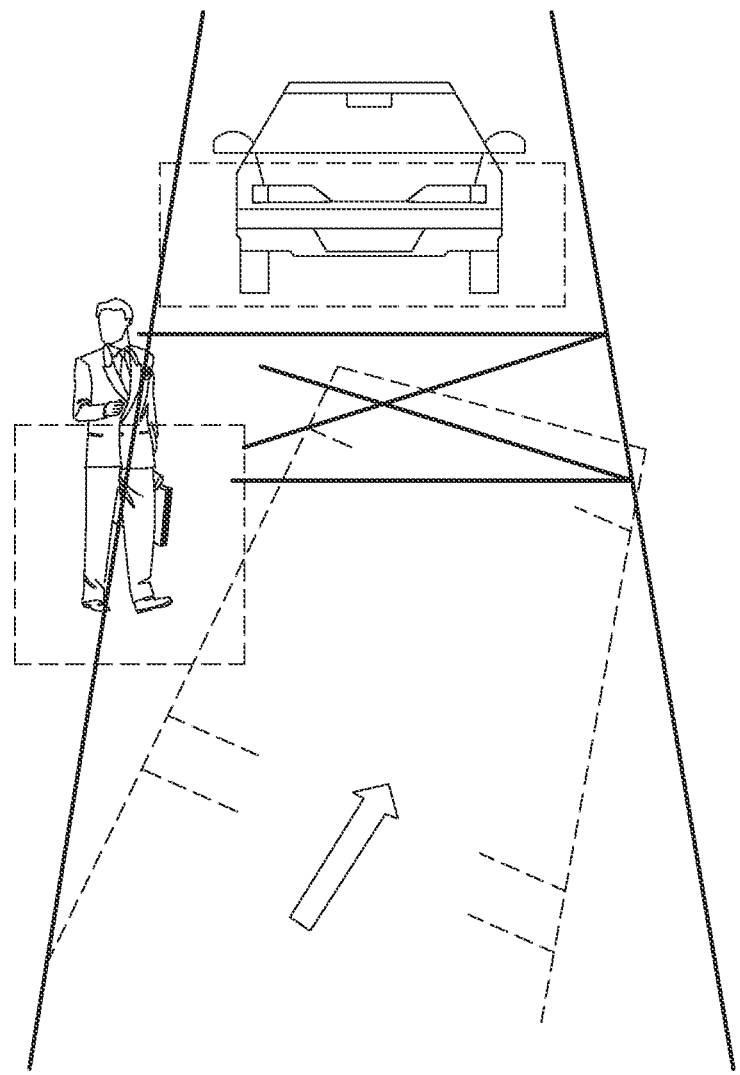

Refer to FIG. 9a and FIG. 9b respectively showing a panoramic image and a diagram of MOD according to one embodiment of the present invention, and refer to FIG. 1 also. The vehicular diagram integration unit 12 integrates the planar images 28, which are respectively captured at four different directions, into a panoramic image, and converts the panoramic image into an aerial view, and then presents the aerial view on the image display device 18. While the vehicular signal receiving device 16 receives a reverse shift signal 20 or a speed signal below 60 Km/h, the system can simultaneously generate panoramic images and detect barriers around the vehicle. The abovementioned barriers include the barriers at the front, rear, left and right of the vehicle, as shown in FIG. 9a. While the vehicular signal receiving device 16 receives a reverse shift signal 20, it means that the driver is preparing for parallel parking or backing into a garage, and the system predicts a driving track for the driver, and detects the surrounding barriers, especially the barriers behind the vehicle. The system further controls the image display device 18 to present the images of barriers and emits alert sound to warn the driver of the barriers lest the vehicle collide with the barriers, as shown in FIG. 9b.

From the above description, it is known: the present invention can effectively integrate ordinary wide-angle lenses to detect lane departure, exempted from using special lenses dedicated to LDW. The present invention uses a vehicular image integration unit to integrate four wide-angle lenses, which are respectively arranged at the front, rear, left and right of the vehicle, and the vehicular signals to detect lane departure, predict the driving track for parallel parking or backing into a garage, generate panoramic images, and recognize surrounding barriers. The present invention can also adopt lenses able to directly convert distorted images into ordinary planar images. The present invention uses the vehicular image integration unit to automatically switch the safety detection mode according to the vehicular signals, guaranteeing the driving safety of the driver.

The embodiments described above are to demonstrate the technical thought and characteristics of the present invention and enable the persons skilled in the art to understand, make, and use the present invention. However, these embodiments are only to exemplify the present invention but not to limit the scope of the present invention. Any equivalent modification or variation according to the spirit of the present invention is to be also included within the scope of the present invention.

What is claimed is:

1. A dynamic lane line detection system comprising:
at least four wide-angle lenses respectively arranged at front, rear, left and right of a vehicle;
a vehicular signal receiving device receiving a gearshift signal of said vehicle, a speed signal of said vehicle, and a turning angle signal of a steering wheel of said vehicle;
an image display device presenting images and outputting sounds; and
a vehicular image integration unit connected with said at least four wide-angle lenses, electrically connected with said vehicular signal receiving device and said image display device, integrating distorted images captured by said at least four wide-angle lenses, said gearshift signal, said speed signal and said turning angle signal, correcting distorted images captured by said wide-angle lens arranged at front of said vehicle into a planar image, presenting said planar image and lane lines before said vehicle on said image display device,.
wherein said vehicular image integration unit uses an image correction method to correct said distorted image captured by said wide-angle lens arranged at front of said vehicle, and wherein said image correction method obtains coordinates of two points at a chord of an arc, cross-projects said two points along two non-parallel lines to a plane to generate coordinates of two new points, and calculates distance between said two new points from a length of said arc and a ratio of an incident angle and a refractive angle.

2. The dynamic lane line detection system according to claim 1, wherein said image correction method is expressed by $$\bar{u} = \frac{1}{\omega r} 2\bar{R} \arctan\left(\frac{r\tan(\frac{\omega}{2})}{\bar{R}}\right)(u - u_0) + u_0$$

$$\bar{v} = \frac{1}{\omega r} 2\gamma\bar{R} \arctan\left(\frac{r\tan(\frac{\omega}{2})}{\gamma\bar{R}}\right)(v - v_0) + v_0 \text{ and}$$

$$r = \sqrt{(u-u_0)^2 + \left(\frac{v-v_0}{\gamma}\right)^2}$$

wherein (u, v) are coordinates on said distorted image, coordinates of a center on said distorted image, and coordinates of said new points, and wherein ω is a curvature radius, a radius of said distorted image, and r a distance between said two new points.

3. The dynamic lane line detection system according to claim 1, wherein said vehicular image integration unit integrates said gearshift signal coming from said vehicular signal receiving device and said distorted images captured by said wide-angle lenses respectively arranged at front, rear, left and right of said vehicle, corrects said distorted images into said planar image, and transmits said planar image to said image display device for presenting a panoramic image surrounding said vehicle.

4. The dynamic lane line detection system according to claim 1, wherein said vehicular image integration unit integrates said speed signal and said gearshift signal, which come from said vehicular signal receiving device, and said distorted images captured by said wide-angle lenses respectively arranged at front, rear, left and right of said vehicle, corrects said distorted images into said planar image, and transmits said planar image to said image display device for presenting information of barriers surrounding said vehicle.

5. The dynamic lane line detection system according to claim 1, wherein said vehicular image integration unit integrates said gearshift signal and said turning angle signal of said steering wheel, which come from said vehicular signal receiving device, and said distorted images captured by said wide-angle lenses respectively arranged at rear of said vehicle, corrects said distorted images into said planar image, and transmits said planar image to said image display device for presenting an image of a predicted track for parallel parking or backing into a garage.

6. The dynamic lane line detection system according to claim 1, wherein said wide-angle lenses are 190 degree wide-angle lenses.

7. The dynamic lane line detection system according to claim 1, wherein said wide-angle lenses are Complementary Metal Oxide Semiconductor (CMOS) based sensors or Charge Coupled Device (CCD) based elements.

8. The dynamic lane line detection system according to claim 1, wherein said image display device is an Light Emitting Diode (LED) display device or an liquid crystal display (LCD) device.

9. The dynamic lane line detection system according to claim 1, wherein said image display device uses a speaker or a buzzer to output sounds.

10. The dynamic lane line detection system according to claim 1, wherein said vehicular image integration unit is Digital Signal Processor (DSP), Field-Programmable Gate Array (FPGA), Car PC, or System on Chip (SoC).

11. A dynamic lane line detection method comprising steps:
obtaining distorted images with wide-angle lenses respectively arranged at front, rear, left and right of a vehicle;
using an image correction method to correct said distorted images and generate a planar image;
detecting lane departure while a vehicular signal receiving device receives a non-reverse shift signal and a speed signal over a default speed; and
transmitting said planar image to an image display device, showing lane lines on said planar image, and providing alert sounds,
wherein said image correction method corrects said distorted images via obtaining coordinates of two points at a chord of an arc, cross-projecting said two points along two non-parallel lines to a plane to generate coordinates of two new points and calculating distance between said two new points from a length of said arc and a ratio of an incident angle and a refractive angle.

12. The dynamic lane line detection method according to claim 11, which selectively undertakes moving obstacle detection, around view monitor, track prediction for parallel parking or track prediction for backing into a garage while said vehicular signal receiving device receives a reverse shift signal or a speed signal below said default speed.

13. The dynamic lane line detection method according to claim 12, which undertakes said around view monitor while said vehicular signal receiving device receives a reverse shift signal or a speed signal below said default speed.

14. The dynamic lane line detection method according to claim 12, which undertakes said moving obstacle detection while said vehicular signal receiving device receives a reverse shift signal or a speed signal below said default speed.

15. The dynamic lane line detection method according to claim 12, which undertakes said track prediction for parallel parking or said track prediction for backing into a garage while said vehicular signal receiving device receives a reverse shift signal and a turning angle signal of a steering wheel.

16. The dynamic lane line detection method according to claim 11, wherein said image correction method is expressed by $$\bar{u} = \frac{1}{\omega r} 2\bar{R} \arctan\left(\frac{r\tan(\frac{\omega}{2})}{\bar{R}}\right)(u-u_0) + u_0$$

$$\bar{v} = \frac{1}{\omega r} 2\gamma\bar{R} \arctan\left(\frac{r\tan(\frac{\omega}{2})}{\gamma\bar{R}}\right)(v-v_0) + v_0 \text{ and}$$

$$r = \sqrt{(u-u_0)^2 + \left(\frac{v-v_0}{\gamma}\right)^2}$$

wherein (u, v) are coordinates on said distorted image, coordinates of a center on said distorted image, and coordinates of said new points, and wherein ω is a curvature radius, a radius of said distorted image, and r a distance between said two new points.

17. The dynamic lane line detection method according to claim 11, wherein said default speed is preset in a vehicular image integration unit.

* * * * *